(12) United States Patent
Chun et al.

(10) Patent No.: US 8,755,338 B2
(45) Date of Patent: Jun. 17, 2014

(54) METHOD AND APPARATUS FOR RELEASING UPLINK RADIO RESOURCE IN WIRELESS COMMUNICATION SYSTEM

(75) Inventors: Jin Young Chun, Seoul (KR); Seunghyun Kang, Seoul (KR); Wookbong Lee, Seoul (KR); Bin Chul Ihm, Seoul (KR)

(73) Assignee: LG Electronics Inc., Seoul (KR)

( * ) Notice: Subject to any disclaimer, the term of this patent is extended or adjusted under 35 U.S.C. 154(b) by 1097 days.

(21) Appl. No.: 12/762,252

(22) Filed: Apr. 16, 2010

(65) Prior Publication Data

US 2010/0272042 A1 Oct. 28, 2010

Related U.S. Application Data

(60) Provisional application No. 61/172,230, filed on Apr. 24, 2009.

(30) Foreign Application Priority Data

Jul. 28, 2009 (KR) .................. 10-2009-0068822

(51) Int. Cl.
*H04W 4/00* (2009.01)

(52) U.S. Cl.
USPC .......................... 370/329; 370/341; 455/509

(58) Field of Classification Search
USPC .................. 370/203, 208, 310–350
See application file for complete search history.

(56) References Cited

U.S. PATENT DOCUMENTS

2008/0069031 A1* 3/2008 Zhang et al. ............... 370/328
2009/0047912 A1* 2/2009 Lee et al. .................... 455/69
2010/0150089 A1* 6/2010 Yu et al. ...................... 370/329

FOREIGN PATENT DOCUMENTS

KR 1020070047720 5/2007
KR 1020070065549 6/2007
KR 1020070073578 7/2007

* cited by examiner

*Primary Examiner* — Warner Wong
(74) *Attorney, Agent, or Firm* — Lee, Hong, Degerman, Kang & Waimey (57) ABSTRACT

A method and apparatus of releasing an uplink radio resource in a wireless communication system, is provided. A user equipment (UE) receives first feedback channel allocation information from a base station (BS), and allocates a uplink radio resource to a feedback channel based on the first feedback channel allocation information. The UE also receives second feedback channel allocation information including an feedback channel release command which indicate the release of the allocated uplink radio resource to the feedback channel, and transmits a release confirm message to the BS through a hybrid automatic repeat request (HARQ) feedback channel (HFBCH) for transmitting a HARQ feedback. the UE releases the allocated uplink radio resource to the feedback channel.

8 Claims, 6 Drawing Sheets

METHOD AND APPARATUS FOR RELEASING UPLINK RADIO RESOURCE IN WIRELESS COMMUNICATION SYSTEM

CROSS-REFERENCE TO RELATED APPLICATIONS

This application claims the benefit of U.S. Provisional Application Ser. No. 61/172,230 filed on Apr. 24, 2009, and also claims the benefit of earlier filing date and right of priority to Korean Patent Application No. 10-2009-0068822 filed on Jul. 28, 2009, the contents of all of which are incorporated by reference in their entirety herein.

BACKGROUND OF THE INVENTION

1. Field of the Invention

The present invention relates to wireless communications, and more particularly, to a method and apparatus for releasing an uplink radio resource without errors in a wireless communication system.

2. Related Art

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., $4^{th}$ generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

A multiple-input multiple-output (MIMO) technique improves efficiency of data transmission and reception by using multiple transmit (Tx) antennas and multiple receive (Rx) antennas. Ever since the MIMO technique was introduced from the IEEE 802.16a standard, the MIMO technique has been constantly updated up to now.

The MIMO technique can be classified into a spatial multiplexing technique and a spatial diversity technique. According to the spatial multiplexing technique, different pieces of data are simultaneously transmitted and thus data can be transmitted at a high speed without increasing a system bandwidth. According to the spatial diversity technique, the same data is transmitted through multiple Tx antennas to obtain diversity, thereby increasing data reliability.

A mobile station (MS) can transmit a feedback in uplink. The feedback includes channel information required for data transmission. By using the feedback received from the MS, a base station (BS) can schedule a radio resource and can transmit data. A closed-loop mode is a mode in which data is transmitted by compensating for channel information included in the feedback received from the MS. An open-loop mode is a mode in which data is transmitted without compensating for the channel information included in the feedback received from the MS. The feedback may not be transmitted in the open-loop mode. Even if the feedback is transmitted, the BS may not use the channel information included in the feedback. Generally, in the communication system, the open-loop mode can be used in a channel environment where the MS moves with a high speed, and the closed-loop mode can be used in a channel environment where the MS moves with a slow speed. More specifically, the open-loop mode is used when the MS moves with a high speed since a channel variation is significant and thus channel information including the feedback is unreliable. In addition, the closed-loop mode is used when the MS moves with a slow speed since a channel variation is relatively less significant and thus the channel information including the feedback is reliable and is less sensitive to delay. Examples of a feedback message transmitted by the MS include a scheduling request that requests radio resource allocation such as a bandwidth request (BR), an acknowledgment (ACK)/negative-acknowledgment (NACK) signal that is a response for downlink data transmission, a channel quality indicator (CQI) that indicates downlink channel quality, MIMO information, etc.

Meanwhile, since limited radio resources are allocated to the uplink channel, the uplink channel needs to be frequently allocated and released to transmit the various types of uplink control signals and feedback messages described above. For this, the BS transmits radio resource allocation information to the MS to allocate and release the radio resources. However, if an error occurs in the release of the uplink channel, a new uplink channel to be allocated by the BS may collide with the existing uplink channel which is not released yet. In particular, an uplink control signal transmitted through an uplink control channel has an important role for the operation of the wireless communication system, and thus collision of the uplink control channel may result in deterioration of reliability of the wireless communication system.

Accordingly, there is a need for a method of releasing an uplink radio resource without errors.

SUMMARY OF THE INVENTION

The present invention provides a method and apparatus for releasing an uplink radio resource without errors in a wireless communication system.

In an aspect, a method of releasing an uplink radio resource in a wireless communication system is provided. The method include receiving first feedback channel allocation information from a base station (BS), allocating a uplink radio resource to a feedback channel based on the first feedback channel allocation information, receiving second feedback channel allocation information including an feedback channel release command which indicate the release of the allocated uplink radio resource to the feedback channel, transmitting a release confirm message to the BS through a hybrid automatic repeat request (HARQ) feedback channel (HFBCH) for transmitting a HARQ feedback, and releasing the allocated uplink radio resource to the feedback channel. The feedback channel release command may be indicated by a duration field in the second feedback channel allocation information. A value of the duration field in the second feedback channel allocation information may be 0. The second feedback channel allocation information may include index information of the release confirm message in the HFBCH. A radio resource for the HFBCH may include three distributed feedback mini-tiles (FMTs), an FMT including two subcarriers and six orthogonal frequency division multiplexing (OFDM) symbols. The FMT may include three HARQ mini-tiles (HMT), an HMT including two subcarriers and two OFDM symbols. The transmitting of the release confirm message to the BS may include selecting a sequence corresponding to the release confirm message from a plurality of sequences, and transmitting the selected sequence by mapping the sequence to a symbol.

In another aspect, a user equipment (UE) for releasing an uplink radio resource in a wireless communication system is provided. The UE include a radio frequency (RF) unit for transmitting and receiving a radio signal, and a processor coupled to the RF unit and configured to receive first feedback channel allocation information from a base station (BS), allocate a uplink radio resource to a feedback channel based on the first feedback channel allocation information, receive second feedback channel allocation information including an feedback channel release command which indicate the release of the allocated uplink radio resource to the feedback channel, transmit a release confirm message to the BS through a hybrid automatic repeat request (HARQ) feedback channel (HFBCH) for transmitting a HARQ feedback, and release the allocated uplink radio resource to the feedback channel. The feedback channel release command may be indicated by a duration field in the second feedback channel allocation information. A value of the duration field in the second feedback channel allocation information may be 0. The second feedback channel allocation information may include index information of the release confirm message in the HFBCH. A radio resource for the HFBCH may include three distributed feedback mini-tiles (FMTs), an FMT including two subcarriers and six orthogonal frequency division multiplexing (OFDM) symbols. The FMT may include three HARQ mini-tiles (HMT), an HMT including two subcarriers and two OFDM symbols. The processor may select a sequence corresponding to the release confirm message from a plurality of sequences, and transmit the selected sequence by mapping the sequence to a symbol.

DESCRIPTION OF EXEMPLARY EMBODIMENTS

A technology below can be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented using radio technology, such as Universal Terrestrial Radio Access (UTRA) or CDMA2000. TDMA can be implemented using radio technology, such as Global System for Mobile communications (GSM)/General Packet Radio Service (GPRS)/Enhanced Data Rates for GSM Evolution (EDGE). OFDMA can be implemented using radio technology, such as IEEE 802.11 (Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a Universal Mobile Telecommunications System (UMTS). 3rd Generation Partnership Project (3GPP) Long Term Evolution (LET) is part of Evolved UMTS (E-UMTS) using Evolved-UMTS Terrestrial Radio Access (E-UTRA), and it adopts OFDMA in downlink (DL) and SC-FDMA in uplink (UL). LTE-A (Advanced) is the evolution of 3GPP LTE.

IEEE 802.16m is chiefly described as an example in order to clarify the description, but the technical spirit of the present invention is not limited to IEEE 802.16m.

Figure 1:
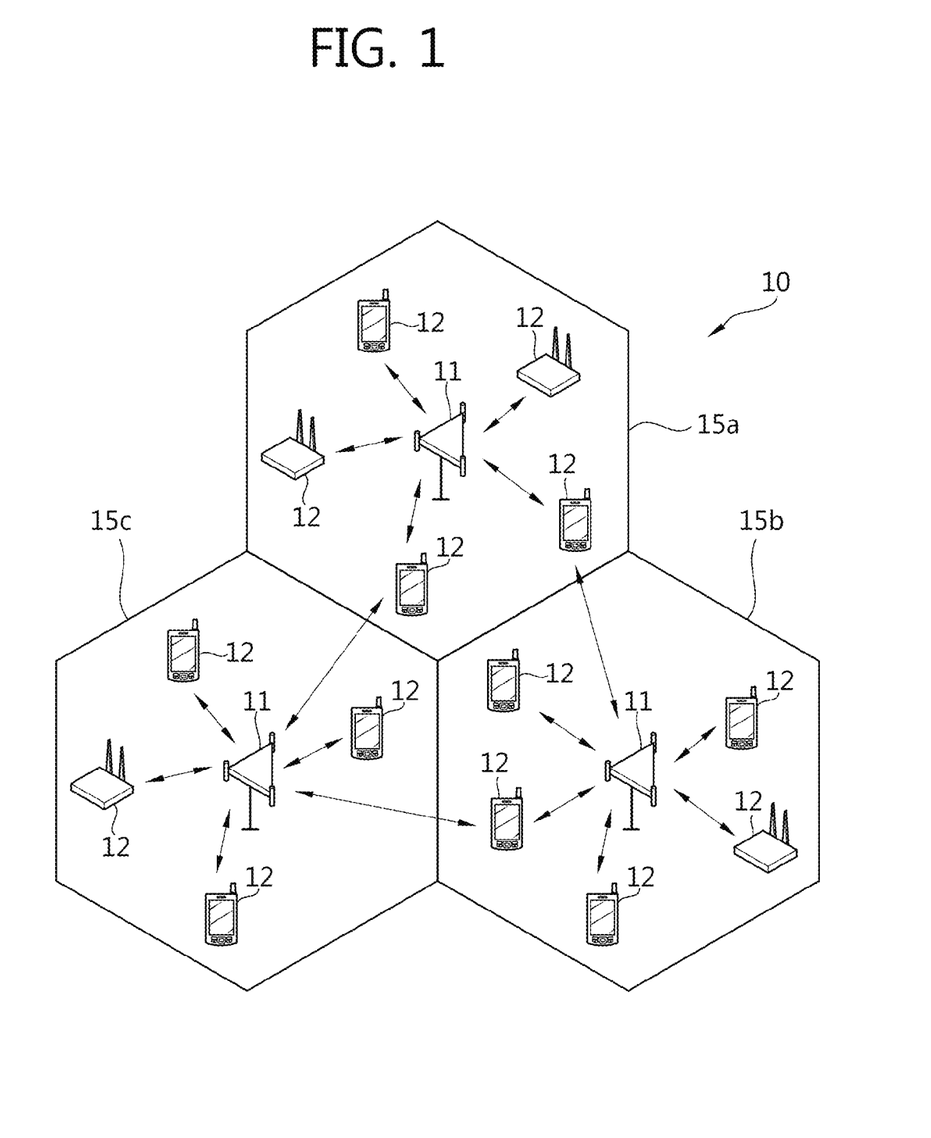
FIG. 1 shows a wireless communication system.

FIG. 1 shows a wireless communication system.

The wireless communication system 10 includes one or more Base Stations (BSs) 11. The BSs 11 provide communication services to respective geographical areas (in general called 'cells') 15a, 15b, and 15c. Each of the cells can be divided into a number of areas (called 'sectors'). A User Equipment (UE) 12 can be fixed or mobile and may be referred to as another terminology, such as a Mobile Station (MS), a Mobile Terminal (MT), a User Terminal (UT), a Subscriber Station (SS), a wireless device, a Personal Digital Assistant (PDA), a wireless modem, or a handheld device. In general, the BS 11 refers to a fixed station that communicates with the UEs 12, and it may be referred to as another terminology, such as an evolved-NodeB (eNB), a Base Transceiver System (BTS), or an access point.

The UE belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

A control channel for transmitting a control signal or a feedback signal is described below. The control channel can be used to transmit various kinds of control signals for communication between a base station and a mobile station. The control channel described hereinafter can include an uplink control channel, a downlink control channel, and a fast feedback channel.

A control channel is designed by taking the following points into consideration.

(1) A plurality of tiles included in a control channel can be distributed over the time domain or the frequency domain in order to obtain a frequency diversity gain. For example, assuming that a DRU includes three tiles each including six consecutive subcarriers on six OFDM symbols, the control channel includes the three tiles, and each of the tiles can be distributed over the frequency domain or the time domain. In some embodiments, the control channel can include at least one tile including a plurality of mini-tiles, and the plurality of mini-tiles can be distributed over the frequency domain or the time domain. For example, the mini-tile can consist of (OFDM symbols×subcarriers)=6×6, 3×6, 2×6, 1×6, 6×3, 6×2, 6×1 or the like. Assuming that a control channel, including (OFDM symbols×subcarriers) of IEEE 802.16e=the tiles of a 3×4 PUSC structure, and a control channel, including mini-tiles, are multiplexed through a Frequency Division Multiplexing (FDM) method, the mini-tiles can consist of (OFDM symbols×subcarriers)=6×2, 6×1, etc. When taking only the control channel, including the mini-tiles, into consideration, the mini-tiles can consist of (OFDM symbols× subcarriers)=6×2, 3×6, 2×6, 1×6 or the like.

(2) To support a high-speed mobile station, the number of OFDM symbols constituting a control channel must be a minimum. For example, in order to support a mobile station moving at the speed of 350 km/h, the number of OFDM symbols constituting a control channel is properly 3 or less.

(3) The transmission power of a mobile station per symbol is limited. To increase the transmission power of a mobile station per symbol, it is advantageous to increase the number of OFDM symbols constituting a control channel. Accordingly, a proper number of OFDM symbols has to be determined with consideration taken of (2) a high-speed mobile station and (3) the transmission power of a mobile station per symbol.

(4) For coherent detection, pilot subcarriers for channel estimation have to be uniformly distributed over the time domain or the frequency domain. The coherent detection method is used to perform channel estimation using a pilot and then find data loaded on data subcarriers. For the power boosting of pilot subcarriers, the number of pilots per OFDM symbol of a control channel has to be identical in order to maintain the same transmission power per symbol.

(5) For non-coherent detection, a control signal has to consist of orthogonal codes/sequences or semi-orthogonal codes/sequences or has to be spread.

The BRCH is a channel requesting radio resources for transmitting uplink data or a control signal which will be transmitted by a mobile station. The HARQ feedback channel is a channel for transmitting ACK/NACK signals in response to data transmission. The FFBCH, the BRCH, the HARQ feedback channel, etc. can be placed anywhere in an uplink subframe or frame.

Examples of the uplink control channel used in the IEEE 802.16m system include a fast feedback channel (FFBCH), a hybrid automatic repeat request (HARQ) feedback control channel (HFBCH), a sounding channel, a ranging channel, a bandwidth request channel (BRCH), etc. The FFBCH carries a feedback of CQI and/or MIMO information, and is classified into two types, i.e., a primary fast feedback channel (PFBCH) and a secondary fast feedback channel (SFBCH). The PFBCH carries 4 to 6-bit information, and provides a wideband CQI and/or a MIMO feedback. The SFBCH carries 7 to 24-bit information, and provides a narrowband CQI and/or a MIMO feedback. The SFBCH can support a larger number of control information bits by using a high code rate. The PFBCH supports non-coherent detection not using a reference signal. The SFBCH supports coherent detection using the reference signal. The FFBCH may be assigned to a predetermined location defined in a broadcast message. The FFBCH may be assigned periodically to an MS. Feedback information of a plurality of MSs may be transmitted through the FFBCH by performing multiplexing according to time division multiplexing (TDM), frequency division multiplexing (FDM), and code division multiplexing (CDM). The FFBCH through which an ACK/NACK signal is transmitted in response to data to which an HARQ scheme is applied may start at a pre-defined offset from data transmission.

The BRCH is a channel requesting radio resources for transmitting uplink data or a control signal which will be transmitted by a mobile station. The HARQ feedback channel is a channel for transmitting ACK/NACK signals in response to data transmission. The FFBCH, the BRCH, the HARQ feedback channel, etc. can be placed anywhere in an uplink subframe or frame.

Figure 2:
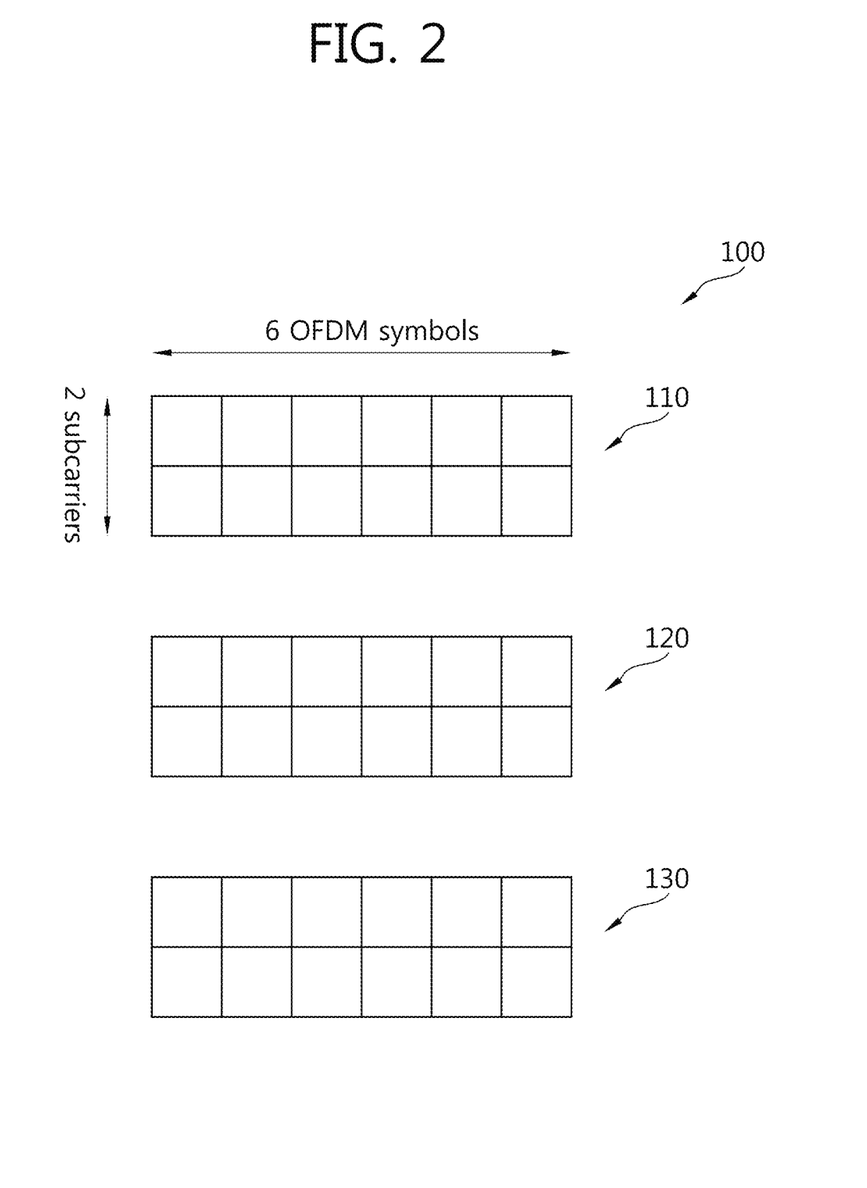
FIG. 2 shows an example of a resource unit used for an uplink control channel in an IEEE 802.16m system.

FIG. 2 shows an example of a resource unit used for an uplink control channel in an IEEE 802.16m system. A resource unit 100 is a resource allocation unit used for transmission of an uplink control channel, and is also referred to as a tile. The tile 100 may be a physical resource allocation unit or a logical resource allocation unit. The control channel includes at least one tile 100, and the tile 100 consists of at least one frequency-domain subcarrier over at least one time-domain OFDM symbol. The tile 100 denotes an aggregation of a plurality of subcarriers contiguous along a time domain and a frequency domain. The tile 100 includes a plurality of data subcarriers and/or pilot subcarriers. A sequence of a control signal may be mapped to the data subcarrier, and a pilot for channel estimation may be mapped to the pilot subcarrier.

The tile 100 includes three mini units 110, 120, and 130. The mini unit is also referred to as a mini tile. The tile 100 may consist of a plurality of mini tiles. The mini tile may consist of at least one frequency-domain subcarrier over at least one time-domain OFDM symbol. Each of the mini tiles 110, 120, and 130 includes two contiguous subcarriers throughout 6 OFDM symbols. The mini tiles 110, 120, and 130 included in the tile 100 may not be contiguous to one another in the frequency domain. This implies that at least one mini tile of another tile may be located between the $1^{st}$ mini tile 110 and the $2^{nd}$ mini tile 120 and/or between the $2^{nd}$ mini tile 120 and the $3^{rd}$ mini tile 130. Frequency diversity can be obtained by locating the mini tiles 110, 120, and 130 included in the tile 100 in a distributive manner.

The number of time-domain OFDM symbols and/or the number of frequency-domain subcarriers included in the mini tile are for exemplary purposes only, and thus the present invention is not limited thereto. The mini tile may include a plurality of subcarriers throughout a plurality of OFDM symbols. The number of OFDM symbols included in the mini tile may differ according to the number of OFDM symbols included in a subframe. For example, if the number of OFDM symbols included in one subframe is 6, the number of OFDM symbols included in a mini tile may be 6.

The OFDM symbol denotes a duration in the time domain, and is not necessarily limited to an OFDM/OFDMA-based system. The OFDM symbol may also referred to as other terms such as a symbol duration. Technical features of the present invention are not limited to a specific multiple access scheme by the term of the OFDM symbol. In addition, the subcarrier denotes an allocation unit in the frequency domain. Although one subcarrier is used for this unit herein, a subcarrier set unit may be used.

A mobile station (MS) may receive radio resource allocation information from a base station (BS) to configure an uplink control channel. The radio resource allocation information may include different information according to a type of the uplink control channel to be configured. Table 1 shows a part of channel quality information channel (CQICH) allocation information which is one of feedback channels of the 802.16e system.

TABLE 1

| Syntax | Size (bit) | Notes |
| --- | --- | --- |
| CQICH_Alloc_IE( ) { | — | — |
|    Length | 4 | Length in bytes (variable). |
|    CQICH_ID | variable | Index to uniquely identify the CQICH resource assigned to the SS. The size of this field is dependent on system parameter defined in UCD. |
|    Duration (d) | 3 | A CQI feedback is transmitted on the CQI channels indexed by the CQICH_ID for 10 × 2d frames. If d == 0, the CQI-CH is de-allocated. If d == 0b111, the SS should report until the BS command for the SS to stop. |
| If (report configuration included == 1) { | — | — |
|    Feedback Type | 2 | 0b00: Physical CINR feedback<br>0b01: Effective CINR feedback<br>0b10-0b11: Reserved |

Referring to Table 1 above, the CQICH allocation information may include a variety of information such as a length of the CQICH, a duration of the CQICH, a feedback type, etc.

Meanwhile, the duration information included in the radio resource allocation information is information that has a direct effect on allocation and release of an uplink control channel. The duration of the uplink control channel may be set to a specific time, or may be set to an infinite time until the BS releases the allocation of the uplink control channel. In general, if the duration is set to the specific time, the uplink control channel is automatically released at the expiry of the specific time, and otherwise if the duration is set to the infinite time, channel release information needs to be separately transmitted for the release of the uplink control channel. In addition, even in a case where the duration is set to the specific time, the uplink control channel may need to be released due to a multiple input multiple output (MIMO) mode change or the like. Referring to Table 1 above, if a value of the duration is '0b111', the duration of the CQICH is set to be infinite. Therefore, in order to release the allocation of the CQICH, the BS has to transmit CQICH allocation information in which the value of the duration is set to '0b000', i.e., channel release information, to the MS. However, if the MS does not successfully receive the channel release information, the MS persistently transmits CQI information through the CQICH even though the BS regards that the allocation of the CQICH is released. Therefore, if the BS allocates a new uplink control channel, the new channel may collide with the non-released CQICH.

Accordingly, a method of releasing an uplink radio resource is proposed, which is characterized in that a release confirm message is transmitted in response to channel release information. The proposed method can release an uplink radio resource without errors, and can effectively allocate radio resources.

Hereinafter, a method of releasing an uplink radio resource without errors in a wireless communication system will be described.

Figure 3:
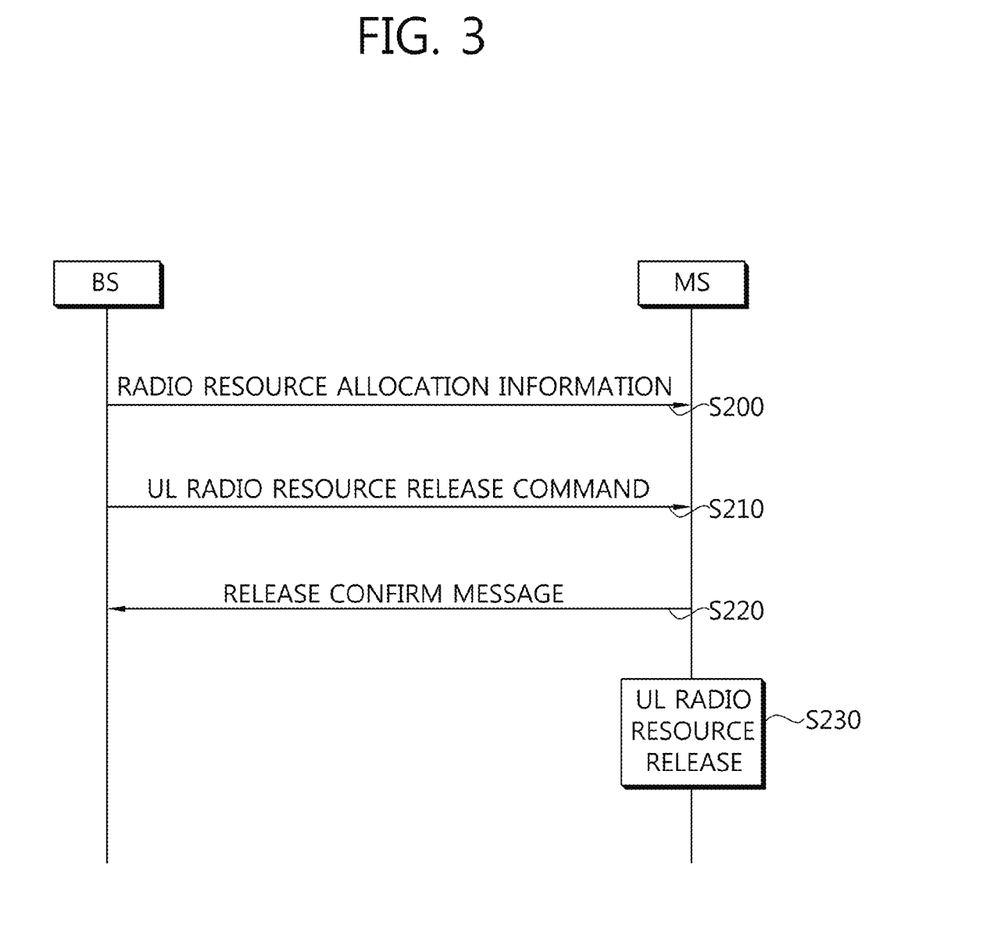
FIG. 3 shows an example of an uplink radio resource release method proposed in the present invention.

FIG. 3 shows an example of an uplink radio resource release method proposed in the present invention.

In step S200, an MS receives radio resource allocation information for an uplink control channel (i.e., channel allocation information) from a BS.

The uplink control channel may be various types of uplink control channels, such as, fast feedback channel, a hybrid automatic repeat request (HARQ) feedback channel, a sounding channel, etc. In particular, in case of the fast feedback channel, the uplink control channel may be a primary fast feedback channel or a secondary fast feedback channel. The radio resource allocation information may be feedback allocation information. The feedback allocation information may include a variety of information such as a period of a feedback channel, a duration of the feedback channel, and a feedback format, etc. The uplink channel is allocated based on the radio resource allocation information.

In step S210, the MS receives an uplink radio resource release command indicating the release of the allocated radio resource. If the uplink control channel to which the radio resource is allocated is the feedback channel, the uplink radio resource release command may be received by setting a feedback channel duration value of the feedback allocation information to '0b000'. Further, the feedback allocation information including the uplink radio resource release command may include an HARQ feedback allocation (HFA) field. The HFA field may include information on a position of an HARQ feedback channel through which a release confirm message is transmitted from the MS.

In step S220, the MS transmits the release confirm message to the BS to confirm the reception of the uplink radio resource release command. The release confirm message may be transmitted through the primary fast feedback channel by using a sequence.

Figure 4:
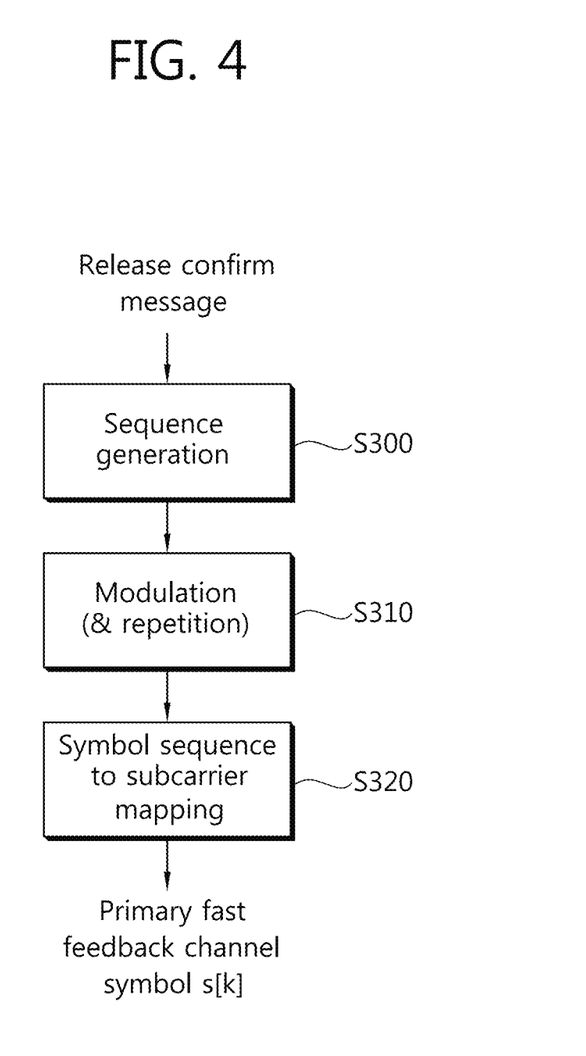
FIG. 4 is a flowchart showing a procedure of transmitting the release confirm message in the primary fast feedback channel.

FIG. 4 is a flowchart showing a procedure of transmitting the release confirm message in the primary fast feedback channel. In step S300, a sequence is generated based on the release confirm message. The sequence may be selected from a predetermined sequence set. In step S310, the sequence is modulated to generate a modulation symbol set consisting of a plurality of modulation symbols. In step S320, the modulation symbol set is mapped to a data subcarrier of a data physical feedback channel (PFBCH) feedback mini-tile (FMT) to configure a primary fast feedback channel symbol, and the release confirm message is finally transmitted through the primary fast feedback channel. Alternatively, the release confirm message may be transmitted through the HARQ feedback channel. A position of the HARQ feedback channel through which the release confirm message is transmitted may be determined by the HFA field included in the feedback allocation information received in step S210 of FIG. 3.

Returning to FIG. 3, in step S230, the MS releases the allocation of the uplink radio resource to release the uplink control channel. Since the MS releases the allocation of the uplink radio resource, the BS can be avoided from redundant allocation of the uplink radio resource.

The proposed method can apply not only to the uplink control channel including the fast feedback channel but also to a feedback header or a message transmitted by the MS through the uplink channel. The feedback header is a type of medium access channel (MAC) header. The feedback header is a response for feedback polling information in general, and is transmitted from the MS to the BS. The feedback polling information is used to configure a dedicated uplink channel in general. When the feedback header is transmitted in response to the feedback polling information, transmission may be performed using a radio resource allocated in the feedback polling information or a feedback request extended sub-header.

Figure 5:
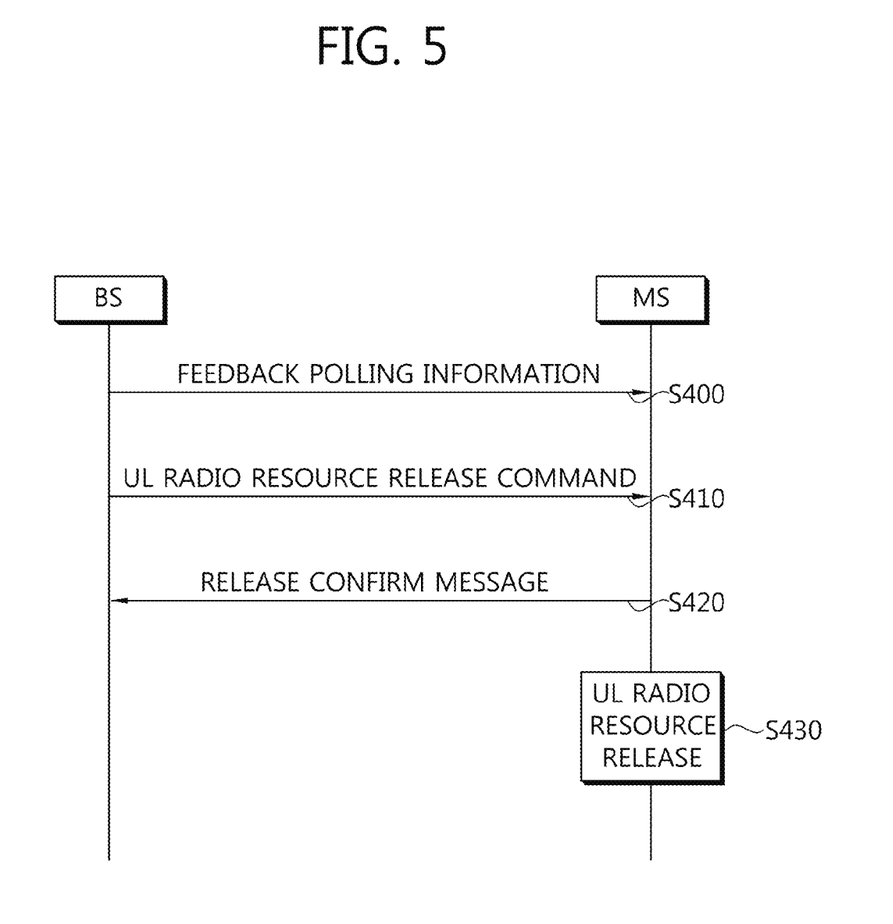
FIG. 5 shows another example of the uplink radio resource release method proposed in the present invention.

FIG. 5 shows another example of the uplink radio resource release method proposed in the present invention.

In step S400, an MS receives feedback polling information from a BS. The MS can transmit a feedback header to the BS by using the feedback polling information.

In step S410, the MS receives an uplink radio resource release command indicating the release of the allocated uplink radio resource.

In step S420, the MS transmits a release confirm message to the BS to confirm the reception of the uplink radio resource release command.

The release confirm message may be transmitted using a feedback type. A feedback header transmitted by the MS to the BS includes a feedback type field. The feedback type field may have a length of 4 bits. Feedback contents transmitted to the BS vary depending on a value of the feedback type field. The feedback contents may include a variety of information such MIMO feedback type information, CQI, uplink transmit power, etc. In this case, a feedback type reserved to transmit specific information for transmission of the release confirm message may be set to a release confirm feedback type. For example, if the feedback type field has a value of '1111', the release confirm message may be transmitted by setting this field to the release confirm feedback type.

In step S430, the MS releases the allocation of the uplink radio resource, and releases the uplink channel. Since the MS releases the allocation of the uplink radio resource, the BS can be avoided from redundant allocation of the uplink radio resource.

Figure 6:
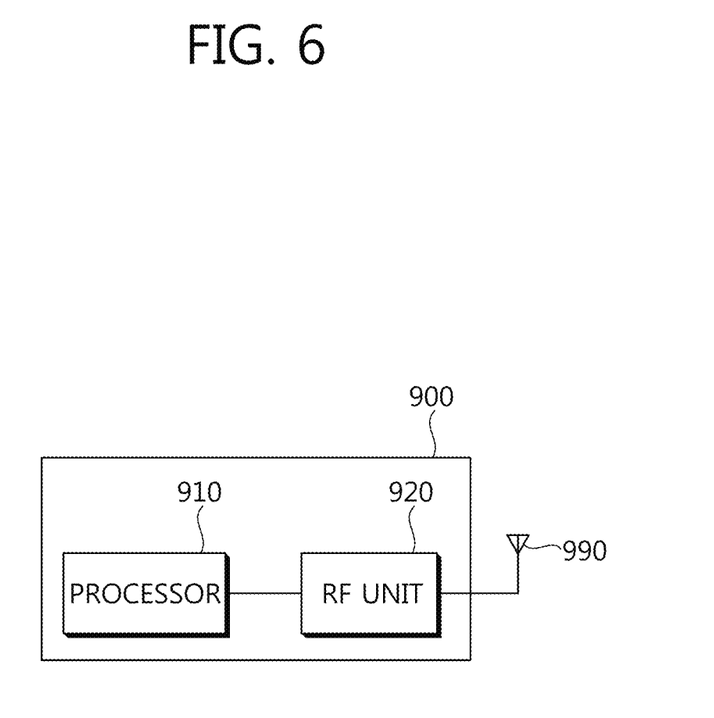
FIG. 6 is a block diagram showing an user equipment (UE) for implementing an embodiment of the present invention.

FIG. 6 is a block diagram showing an user equipment (UE) for implementing an embodiment of the present invention.

An UE 900 includes a processor 910 and a radio frequency (RF) unit 920. The processor 910 implements the proposed functions, processes, and/or methods. The processor 910 receives first feedback channel allocation information from a base station (BS), allocates a uplink radio resource to a feedback channel based on the first feedback channel allocation information, receives second feedback channel allocation information including an feedback channel release command which indicate the release of the allocated uplink radio resource to the feedback channel, transmits a release confirm message to the BS through a hybrid automatic repeat request (HARQ) feedback channel (HFBCH) for transmitting a HARQ feedback, and releases the allocated uplink radio resource to the feedback channel. The RF unit 920 is coupled to the processor 910, and transmits/receives a radio signal.

According to the present invention, a base station receives a confirmation on whether to release an uplink radio resource from a mobile station to avoid redundant allocation of an uplink radio resource.

The present invention can be implemented using hardware, software, or a combination of them. In the hardware implementations, the present invention can be implemented using an Application Specific Integrated Circuit (ASIC), a Digital Signal Processor (DSP), a Programmable Logic Device (PLD), a Field Programmable Gate Array (FPGA), a processor, a controller, a microprocessor, other electronic unit, or a combination of them, which is designed to perform the above-described functions. In the software implementations, the present invention can be implemented using a module performing the above functions. The software can be stored in a memory unit and executed by a processor. The memory unit or the processor can use various means which are well known to those skilled in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of releasing an uplink radio resource in a wireless communication system, the method comprising:
   receiving first feedback channel allocation information from a base station (BS), the first feedback channel allocation information including a duration field set to other than 0b000 which indicates a duration of an uplink (UL) fast feedback channel;
   allocating the UL fast feedback channel based on the first feedback channel allocation information;
   receiving second feedback channel allocation information including a duration field set to 0b000 which indicates a release of the UL fast feedback channel;
   transmitting a release confirm message to the BS through a hybrid automatic repeat request (HARQ) feedback channel (HFBCH) for transmitting a HARQ feedback; and
   releasing the UL fast feedback channel,
   wherein a radio resource for the HFBCH comprises three distributed feedback mini-tiles (FMTs), an FMT including two subcarriers and six orthogonal frequency division multiplexing (OFDM) symbols.

2. The method of claim 1, wherein the second feedback channel allocation information further includes index information of the release confirm message in the HFBCH.

3. The method of claim 1, wherein the FMT further includes three HARQ mini-tiles (HMT), an HMT including two subcarriers and two OFDM symbols.

4. The method of claim 1, wherein the transmitting of the release confirm message to the BS comprises:
   selecting a sequence corresponding to the release confirm message from a plurality of sequences; and
   transmitting the selected sequence by mapping the sequence to a symbol.

5. A user equipment (UE) for releasing an uplink radio resource in a wireless communication system, the UE comprising:
   a radio frequency (RF) unit for transmitting and receiving a radio signal; and a processor coupled to the RF unit and configured to:
receive first feedback channel allocation information from a base station (BS), the first feedback channel allocation information including a duration field set to other than 0b000 which indicates a duration of an uplink (UL) fast feedback channel;
allocate the UL fast feedback channel based on the first feedback channel allocation information;
receive second feedback channel allocation information including a duration field set to 0b000 which indicates a release of the UL fast feedback channel;
transmit a release confirm message to the BS through a hybrid automatic repeat request (HARQ) feedback channel (HFBCH) for transmitting a HARQ feedback; and
release the UL fast feedback channe,
wherein a radio resource for the HFBCH comprises three distributed feedback mini-tiles (FMTs), an FMT including two subcarriers and six orthogonal frequency division multiplexing (OFDM) symbols.

6. The UE of claim 5, wherein the second feedback channel allocation information further includes index information of the release confirm message in the HFBCH.

7. The UE of claim 5, wherein the FMT further includes three HARQ mini-tiles (HMT), an HMT including two subcarriers and two OFDM symbols.

8. The UE of claim 5, wherein the processor is further configured to select a sequence corresponding to the release confirm message from a plurality of sequences and transmit the selected sequence by mapping the sequence to a symbol.

* * * * *